United States Patent [19]

Loughran et al.

[11] 3,987,003

[45] Oct. 19, 1976

[54] THERMALLY STABLE DIOXO AND DITHIO-BENZISOQUINOLINE COMPOSITIONS AND PROCESS OF SYNTHESIZING SAME

[75] Inventors: Gerard A. Loughran, Kettering; Fred E. Arnold, Centerville, both of Ohio

[73] Assignee: The United States of America as represented by the Secretary of the Air Force, Washington, D.C.

[22] Filed: June 6, 1975

[21] Appl. No.: 584,568

[52] U.S. Cl. .................. 260/33.4 R; 260/47 CP; 260/78 TF; 260/78.3 R; 260/79
[51] Int. Cl.² .............................................. C08K 5/13
[58] Field of Search ....... 260/47 CP, 78 TF, 33.4 R, 260/79

[56] References Cited
UNITED STATES PATENTS

| | | | |
|---|---|---|---|
| 3,549,594 | 12/1970 | Twilley et al. | 260/47 CP |
| 3,803,103 | 4/1974 | Magay | 260/47 CP X |

Primary Examiner—Lewis T. Jacobs
Attorney, Agent, or Firm—Joseph E. Rusz; Cedric H. Kuhn

[57] ABSTRACT

Thermally stable dioxo and dithio-benzisoquinoline polymers are synthesized by the polycondensation of oxyarylene and thioarylene bis-naphthalic acid dianhydrides and aromatic diamino compounds. The compositions are particularly useful in high temperature applications such as in the fabrication of plastics, composites, fibrous materials, protective coatings and films.

10 Claims, No Drawings

3,987,003

THERMALLY STABLE DIOXO AND DITHIO-BENZISOQUINOLINE COMPOSITIONS AND PROCESS OF SYNTHESIZING SAME

RIGHTS OF THE GOVERNMENT

The invention described herein may be manufactured and used by or for the Government of the United States for all governmental purposes without the payment of any royalty.

FIELD OF THE INVENTION

This invention relates to highly fused, heterocyclic polymers which possess a high degree of thermal stability. In one aspect it relates to a process for synthesizing the polymeric materials.

BACKGROUND OF THE INVENTION

In recent years a large amount of research work has been carried out with the object of synthesizing polymeric materials having high temperature properties, i.e., the ability to retain their physical and chemical characteristics as well as their dimensional stability at elevated temperatures. To a great extent, the demand for such materials has been accelerated because of their utility in aerospace applications such as in the fabrication of nose cones and heat shields for space vehicles, rocket engine components, and the like. Because of their thermal stability, the aromatic, heterocyclic polymers have been found to be especially useful in aerospace applications. Unfortunately, the fused and highly aromatic nature of these ring systems, which give them their exceptional stability, tends to render them intractable.

It is an object of this invention, therefore, to provide improved thermally stable, aromatic, heterocyclic polymers.

Another object of the invention is to provide thermally stable polymeric materials which are soluble in common aprotic solvents.

A further object of the invention is to provide a process for synthesizing the polymeric materials of high thermal stability.

Other objects and advantages of the invention will become apparent to those skilled in the art upon consideration of the accompanying disclosure.

SUMMARY OF THE INVENTION

The present invention resides in a thermally stable polymer which consists essentially of recurring units having the following formula:

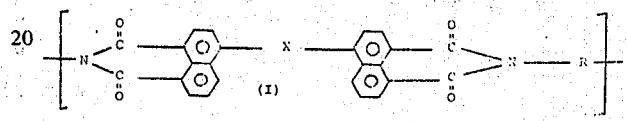

wherein X is

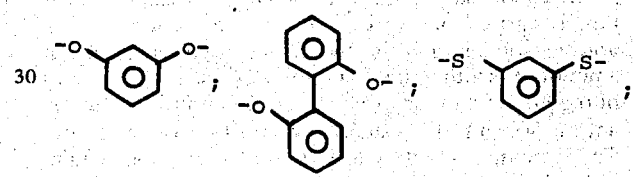

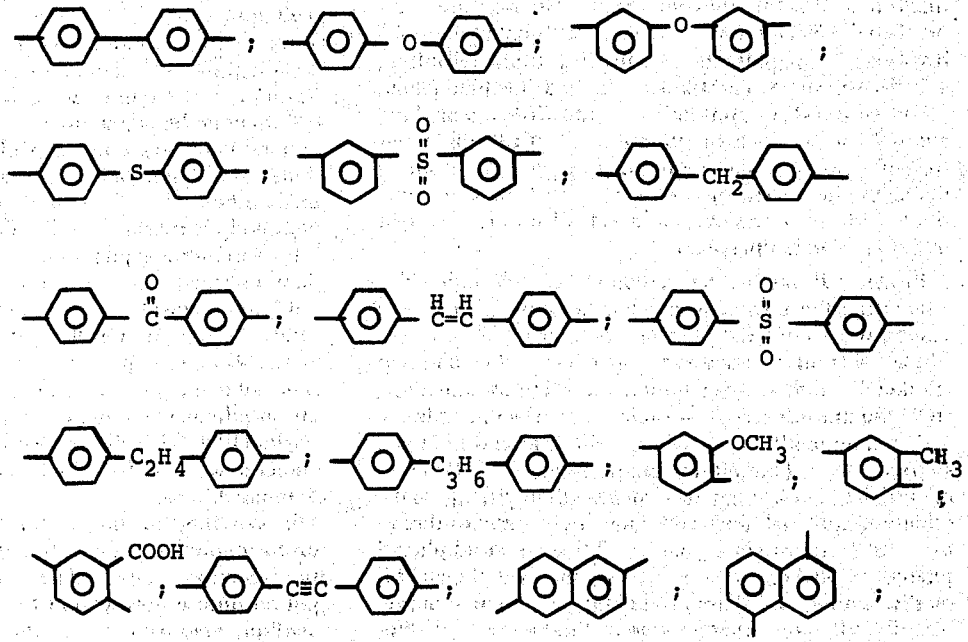

a divalent aromatic radical such as and the like. There are usually at least 2 and preferably at least 4 of the recurring units in the polymer. In general, the number of repeating units is such that the polymer has an inherent viscosity of 0.10 to 1.0 as determined in sulfuric acid at 30° C.

In one embodiment, the present invention resides in a process for preparing the highly fused, heterocyclic polymers. Thus, the polymers are synthesized by the condensation of an oxyarylene or thioarylene bis-naphthalic acid dianhydride with an aromatic diamino compound. The condensation reaction involved is illustrated by the following equation:

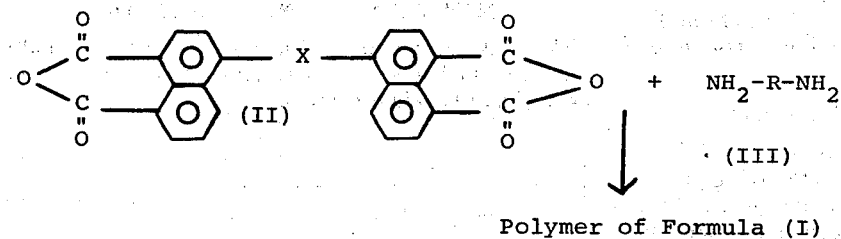

Polymer of Formula (I)

In the above equation X and R are as indicated hereinabove.

The condensation reaction shown by the above equation is carried out under an inert atmosphere in an aprotic solvent and in the presence of a catalytic amount of isoquinoline. Any suitable inert gas, such as nitrogen, helium or argon, can be utilized. As an aprotic solvent, it is usually preferred to use m-cresol. The amount of catalyst employed can vary within rather broad limits, but usually falls in the range of 0.05 to 1.5 weight percent, based upon the weight of the monomers (compounds of Formulas II and III). The reaction is generally conducted at a temperature ranging from about 150 to 250° C for a period of about 10 to 30 hours. Although a slight excess of one of the monomers can be employed, the monomers are preferably used in equimolar amounts. Moreover, in order to prevent the production of lower molecular weight products, use of a considerable excess of one of the monomers should be avoided.

Examples of oxyarylene and thioarylene bis-naphthalic acid dianhydrides which can be used are 2,2'-bis(4-oxy-1,8-naphthalic anhydride)biphenyl, 4,4'-bis(4-oxy-1,8-naphthalic anhydride)diphenylsulfide, 1,3-bis(4-thio-1,8-naphthalic anhydride)phenylene, 1,3-bis(4-oxy-1,8-naphthalic anhydride)phenylene, and 4,4'-bis(4-oxy-1,8-naphthalic anhydride)diphenylsulfone. These compounds are prepared by aromatic nucleophilic substitution of various aryl diols and bis-thiols with 4-bromonaphthalic anhydride as described in detail in Examples I to V.

In general, any aromatic diamine can be utilized in preparing the polymers of this invention. Examples of such compounds that can be advantageously used include 4,4'-diaminodiphenyl propane, 4,4'-diaminodiphenyl methane, benzidine, 3,3'-dichlorobenzidine, 4,4'-diamino-diphenyl sulfide, 4,4'-diaminostilbene, 3,3'-diaminodiphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine, 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulfo-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminophenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulfodiaminobenzophenone, 3,3'-diaminodiphenylmethane, 3,3'-diaminodiphenylether, 3,3'-diaminodiphenylsulfide, 3,3'-diaminodiphenylsulfone, 3,3'diaminodiphenylpropane, 3,3'-diaminobenzophenone, 3,4-diaminotoluene, 2,6-diaminotoluene, 1-isopropyl-3,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are m-phenylenediamine, P-phenylenediamine, 4,4'-oxydianiline-3,3'-sulfonyldianiline, 4,4'-diaminobenzophenone, 4,4'-methylenedianiline and 4,4'-diaminostilbene.

In isolating the polymer product, the reaction mixture is cooled, e.g., to room temperature, at the end of the reaction period. The reaction mixture is then poured into a non-solvent for the polymer, such as an alcohol, water or a weak acid, thereby causing precipitation of the polymer from solution. After recovery of the polymer as by filtration or decantation, it is washed, e.g., with an alcohol and then dried. The foregoing procedure can be repeated one or more times in order to further purify the polymer.

A more complete understanding of the invention can be obtained by referring to the following illustrative examples which are not intended, however, to be unduly limitative of the invention.

EXAMPLE I 2,2'-Bis(4oxy-1,8-naphthalic anhydride)biphenyl

To a solution containing 2.32 g (0.0125 mole) of o,o'-dihydroxybiphenyl in 150 ml of N,N'-dimethylacetamide was added, under a nitrogen atmosphere, 10 ml of a 10% aqueous solution of sodium hydroxide solution. The mixture was heated to 80° C and a solution of 6.93 g (0.025 mole) of 4-bromo-1,8-naphthalic anhydride dissolved in 150 ml of benzene was added dropwise over a one-hour period as the temperature rose to 100° C and water was removed as an azeotrope. The benzene was removed after 8 hours, and the reaction mixture was precipitated into water to give an orange solid which was collected and dried at room temperature. The product was recrystallized from p-dioxane to give 6.9 g (95%), m.p. 287.5°–287.6° C.

Analysis-Calc'd for $C_{36}H_{18}O_8$ (percent): C,74.73; R,3.14. Found (percent): C,74.67; H,3.21.

EXAMPLE II 4,4'-Bis(4-oxy-1,8-naphthalic anhydride)diphenylsulfide

To a solution containing 1.92 g (0.02 mole) of potassium-t-butoxide in 200 ml of tetrahydrofuran was added, under a nitrogen atmosphere, 2.18 g (0.01 mole) of 4,4'-dihydroxydiphenyl sulfide to give the potassium salt of the diol as a white precipitate. A solution containing 5.54 g (0.02 mole) of 4-bromonaphthalic acid dianhydride dissolved in 200 ml of N,N'-dimethylacetamide was added and the tetrahydrofuran was removed by distillation. The reaction mixture was refluxed for 6 hours and the solvent removed under reduced pressure. The residual solid was recrystallized from 200 ml of chlorobenzene to give 5.9 g (96.7%) of product melting at 274.4°–275.4° C.

Analysis-Calc'd for $C_{36}H_{18}O_8S$ (percent) : C,70.81; H,2.97; S,5.25. Found (percent): C,70.69; H,2.85; S,5.36.

EXAMPLE III 1,3-Bis(4-thio-1,8-naphthalic anhydride)phenylene

To a solution of 1.92 g (0.02 mole) of potassium-t-butoxide in 100 ml of tetrahydrofuran was added, under a nitrogen atmosphere, 1,42 g (0.01 mole) of m-benzenedithiol. To this solution was then added dropwise a solution of 5.54 g (0.02 mole) of 4-bromonaphthalic acid anhydride in 200 ml of N,N'-dimethylacetamide to give a brown liquid which changed to a clear amber liquid upon complete addition of the anhydride. The reaction mixture was heated and stirred under a nitrogen atmosphere as the tetrahydrofuran was removed by distillation. The reaction mixture was heated to 150° C and maintained at that temperature for six hours. After cooling to room temperature, the inorganic salts were removed by filtration and the solvent in the filtrate was removed under reduced pressure. The residual gummy tan residual was recrystallized from dioxane with charcoal treatment and dried under reduced pressure to give 4.0 g (75%) yield, m.p. 222.5°–223° C.

Analysis-Calc'd for $C_{30}H_{14}O_6S_2$ (percent): C,67.41; H,2.64; N,12.00. Found (percent): C,67.15; H,2.62; N,11.98.

EXAMPLE IV 1,3-Bis(4-oxy-1,8-naphthalic anhydride)phenylene

To a solution of 1.10 g (0.01 mole) of resorcinol in 50 ml of anhydrous benzene was added 1.04 g (0.02 mole) of sodium methoxide. The solution was stirred at room temperature for 1 hour and 5.52 g (0.02 mole) of 4-bromonaphthalic acid dianhydride dissolved in 100 ml of N,N'-dimethylacetamide was added. The reaction mixture was heated to 80° C to remove the benzene and then slowly heated to 150° C and maintained at that temperature for six hours. The cooled solution was poured over ice to precipitate a light yellow solid. The bis-dianhydride was collected, washed with water, dried under reduced pressure, and recrystallized from acetone to afford 4.10 g (81.6%) m.p. 271°–272° C.

Analysis-Calc'd for $C_{30}H_{14}O_8$ (percent): C,71.71; H,2.80. Found (percent): C,71.63; H,2.69.

EXAMPLE V 4,4'-Bis(4-oxy-1,8-naphthalic anhydride)diphenylsulfone

To a solution containing 3.13 g (0.0125 mole) of 4,4'-dihydroxydiphenyl sulfone in 150 ml of N,N'-dimethylacetamide was added, under a nitrogen atmosphere, 10 ml of a 10% aqueous sodium hydroxide solution. The mixture was heated to 80° C, and a solution of 6.93 g (0.025 mole) of 4-bromo-1,8-naphthalic anhydride dissolved in 200 ml of toluene was added dropwise over a one-hour period as the temperature rose to 100° C and water was removed as an azeotrope. The toluene was removed after 8 hours, and the reaction mixture was precipitated into water to give a yellow solid which was collected and dried at 160° C/40 mm. The product was recrystallized from N,N'-dimethylacetamide to give 7.5 g (93%), m.p. <300° C.

Analysis-Calc'd for $C_{36}H_{18}O_{10}S$: C,67.28; H,2.82; S,4.99. Found (percent): C,67.03; H,2.70; S,5.15.

EXAMPLE VI

Poly[(1,3dioxo-1H-benz[de]isoquinoline-2,6-(3H)-diyl)oxy-2,2'-biphenylyleneoxy(1,3-dioxo-1H-benz-[de]isoquinoline-6,2(3H)-diyl)-p-phenyleneoxy-p-phenylene]

A solution containing 0.641 g (0.0032 mole) of oxydianiline, 1.84 g (0.0032 mole) of 2,2'-bis(4-oxy-1,8-naphthalic anhydride)biphenyl and 0.18 g of isoquinoline dissolved in 25 ml of m-cresol was heated, under a nitrogen atmosphere, at 180°–200° C for 20 hours. The reaction mixture was cooled to room temperature and the polymer was precipitated into 1.5 l of methanol. The polymer was collected and washed several times with methanol and air dried to give 2.3 g (99%). The polymer had an inherent viscosity of 0.15 dl/g in sulfuric acid (0.5 g/100 ml at 30° C). The polymer exhibited a glass transition, Tg, at 260° c by Differential Scanning Calorimeter (DSC).

Analysis-Calc'd for $(C_{48}H_{26}O_7N_2)_n$ (percent): C,77.62; H,3.53; N,3.77. Found (percent): C,72.20; H,3.08; N,3.56.

EXAMPLE VII

Poly[(1,3dioxo-1H-benz[de]isoquinoline-2,6(3H)-diyl)oxy-m-phenyleneoxy(1,3-dioxo-1H-benz[de]-isoquinoline-6,2(3H)-diyl)-p-phenyleneoxy-p-phenyl]

To 37 ml of m-cresol was added, under a nitrogen atmosphere, 2.512 g (0.005 mole) of 1,3-bis(4-oxy-1,8l-naphthalic anhydride)-phenylene, 1.001 g (0.005 mole) of oxydianiline and .037 g of isoquinoline. The mixture was slowly heated to 180° C and maintained at that temperature for 18 hours. The temperature was then increased to 202° C and maintained at that temperature for 3 hours. The reaction mixture was cooled to room temperature and precipitated into methanol. The polymer was collected, washed with methanol, dried under reduced pressure, and reprecipitated from methane sulfonic acid. The polymer 3.7 g (100%) had an intrinsic viscosity of 0.20 as determined in sulfuric acid and a Tg of 260° C (DSC).

Analysis-Calc'd for $(C_{42}H_{22}O_7N)_n$ (percent): C,75.70; H,3.33; N,4.20. Found (percent): C,72.96; H,3.04; N,4.22.

EXAMPLE VIII

Poly[(1,3-dioxo-1H-benz[de]isoquinoline-2,6-(3H)-diyl)thio-m-phenylenethio(1,3-dioxo-1H-benz-[de]isoquinoline-6,2(3H)-diyl)p-phenyleneoxy-p-phenylene]

A solution containing 0.3057 g (0.00153 mole) of oxydianiline 0.8154 g (0.00153 mole) of 1,3-bis(4-thio-1,8-naphthalic anhydride)phenylene and 0.08 g of isoquinoline dissolved in 12 ml of m-cresol was heated, under a nitrogen atmosphere, for 20 hours at 180° C–200° C. The reaction mixture was allowed to cool to room temperature and the polymer was precipitated into 1.5 l of methanol. The polymer was collected and washed several times with methanol and air dried to give 1.04 g (97%) which had an inherent viscosity of 0.26 dl/g in sulfuric acid (0.5 g/100 ml at 30° C) and a Tg of 253° C (DSC). Analysis-Calc'd for $(C_{42}H_{22}O_5N_2S_2)_n$ (percent): C,72.19; H,3.17; N,4.01; S,9.18. Found (percent): C,71.21; H,2.97; N,4.06; S,8.68.

EXAMPLE IX

Poly[(1,3-dioxo-1H-benz[de]isoquinoline-2,6(3H)-diyl)oxy-4,4'-diphenylsulfideoxy(1,3-dioxo-1H-benz-[de]isoquinoline-6,2(3H)-diyl)-p-phenyleneoxy-p-phenylene]

A solution containing 0.5058 g (0.0025 mole) of oxydianiline, 1.564 g (0.0025 mole) of 4,4'-bis(4-oxy-1,8-naphthalic anhydride)diphenylsulfide and 0.16 g of isoquinoline dissolved in 20 ml of m-cresol was heated, under a nitrogen atmosphere, for 20 hours at 180°–200° C. The cooled reaction mixture was poured into 1.5 l of methanol to precipitate the polymer. The product was collected and washed several times with methanol and air dried to give 1.45 g (75%) which had an inherent viscosity of 0.30 dl/g in sulfuric acid (0.5 g/100 ml at 30° C). The polymer exhibited a Tg of 269° C (DSC).

Analysis-Calc'd for $(C_{48}H_{26}O_7N_2S)_n$ (percent): C,74.41; H,3.38; N,3.62; S,4.14. Found (percent): C,72.55; H,3.16; N,3.25; S,4.07.

EXAMPLE X

Poly[(1,3-dioxo-1H-benz[de]isoquinoline-6,2(3H)-diyl)-oxy-4,4'-diphenylsulfoneoxy(1,3-dioxo-1H-benz-[de]isoquinoline-6,2(3H)-diyl)-p-phenyleneoxy-p-phenylene]

A solution containing 0.5008 g (0.0025 mole) of oxydianiline, 1.606 g (0.0025 mole) of 4,4'-bis(4-oxy-1,8-naphthalic anhydride)diphenylsulfone and 0.16 g of isoquinoline dissolved in 20 ml of m-cresol was heated, under a nitrogen atmosphere, at 180°–200° C for 20 hours. The cooled reaction mixture was poured into 500 ml of methanol to precipitate the polymer. The product was collected, washed several times with methanol and air dried to give 2.0 g (99%) which had an inherent viscosity of 0.29 dl/g in sulfuric acid (0.5 g/100 ml at 30° C). The polymer exhibited a Tg of 317° C (DSC).

Analysis-Calc'd for $(C_{48}H_{26}O_9N_2S)_n$ (percent): C,71.46; H,3.25; N,3.47; S,3.97. Found (percent): C,68.77; H,3.01; N,3.18; S,4.15.

The polymers prepared as described above were completely soluble in m-cresol at concentrations up to 15 percent. Thermal gravimetric analysis of the polymers, as determined in the Chevenard Apparatus, showed that decomposition of the polymers commenced at 450° C in air and at 500° C in nitrogen.

From the foregoing, it is seen that the polymers of this invention are soluble in an aprotic solvent, such as m-cresol, and are thermally stable at elevated temperatures. These desirable properties render them especially useful for high temperature applications and facilitate the fabrication of composites and the preparation of protective coatings.

As will be evident to those skilled in the art, modifications of the present invention can be made in view of the foregoing disclosure without departing from the spirit and scope of the invention.

We claim:

1. A thermally stable polymer consisting essentially of recurring units having the following formula:

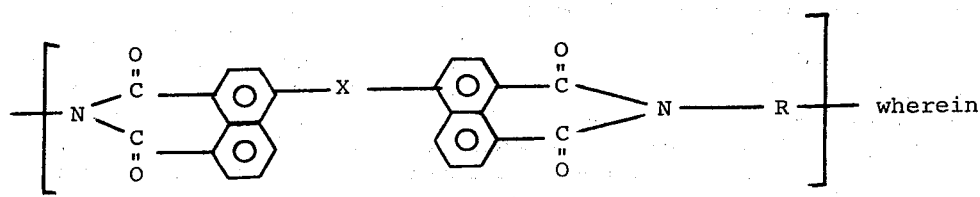 wherein

X is 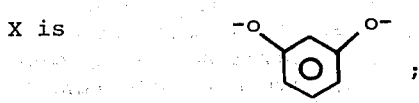 ;

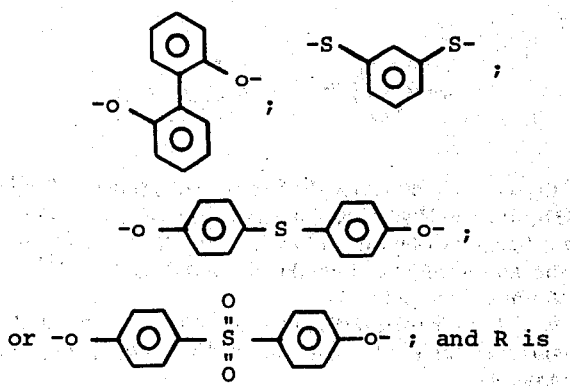

or -o 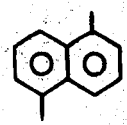 ; and R is a divalent aromatic radical.

2. The thermally stable polymer according to claim 1 in which R is

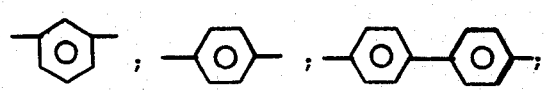

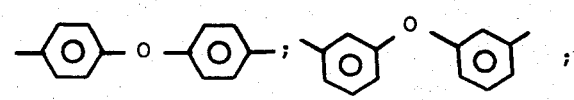

or

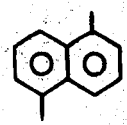.

3. The thermally stable polymer according to claim 1 in which X is

-o-⌬-o- and R is

-⌬-O-⌬-.

4. The thermally stable polymer according to claim 1 in which X is (biphenyl-o-)

and R is

-⌬-O-⌬-.

5. The thermally stable polymer according to claim 1 in which X is

-S-⌬-S- and R is

-⌬-O-⌬-.

6. The thermally stable polymer according to claim 1 in which X is

-o-⌬-S-⌬-o- and R is

-⌬-O-⌬-.

7. The thermally stable polymer according to claim 1 in which X is

-o-⌬-SO₂-⌬-o- and R is

-⌬-O-⌬-.

8. A process for preparing highly fused, heterocyclic polymers which comprises reacting a compound having the following formula:

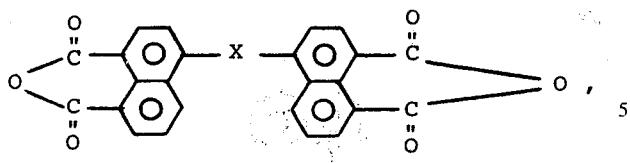

wherein X is

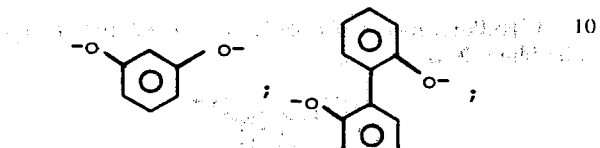

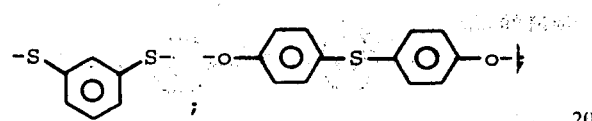

or

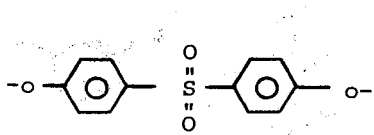

with a compound having the following formula: NH$_2$-R-NH$_2$, wherein R is a divalent aromatic radical, the reaction being carried out in an aprotic solvent, under an inert atmosphere and in the presence of a catalytic amount of isoquiniline.

9. The process according to claim 8 in which about equimolar amounts of the compounds are reacted in m-cresol.

10. The process according to claim 9 in which the compounds are reacted at a temperature ranging from about 150° to 250° C for a period of about 10 to 30 hours.

* * * * *